United States Patent [19]
Few et al.

[11] Patent Number: 6,102,438
[45] Date of Patent: Aug. 15, 2000

[54] VEHICLE LEVELING AND STABILIZING APPARATUS

[76] Inventors: Jeffrey P. Few, 503 S. Main St., Elkhart, Ind. 46514; Bernard F. Garceau, 12244 Saddle Horn Ct., Granger, Ind. 46530

[21] Appl. No.: 09/124,615

[22] Filed: Jul. 29, 1998

Related U.S. Application Data

[63] Continuation-in-part of application No. 08/752,264, Nov. 19, 1996, Pat. No. 5,901,980.

[51] Int. Cl.⁷ ........................................................ B66F 7/20
[52] U.S. Cl. .................................. 280/763.1; 280/764.1; 280/766.1; 254/424
[58] Field of Search .............................. 280/763.1, 764.1, 280/765.1, 766.1; 254/424, 126, 425, 419

[56] References Cited

U.S. PATENT DOCUMENTS

| | | |
|---|---|---|
| 512,585 | 1/1894 | King . |
| 2,519,364 | 12/1950 | Fredholm . |
| 3,345,038 | 10/1967 | Taylor . |
| 3,565,396 | 2/1971 | Spear . |
| 3,667,730 | 6/1972 | Kollmar . |
| 3,767,226 | 10/1973 | Stephens . |
| 4,103,869 | 8/1978 | Mesny . |
| 4,146,250 | 3/1979 | Merdes . |
| 4,245,855 | 1/1981 | Larson . |
| 4,289,300 | 9/1981 | Weisser et al. . |
| 5,042,779 | 8/1991 | Eden . |
| 5,205,586 | 4/1993 | Tallman . |
| 5,348,330 | 9/1994 | Few . |
| 5,474,330 | 12/1995 | Meehleder . |
| 5,501,428 | 3/1996 | Garceau . |
| 5,901,980 | 5/1999 | Few et al. ............................ 280/763.1 |

FOREIGN PATENT DOCUMENTS

| | | |
|---|---|---|
| 828047 | 12/1951 | Germany . |
| 107902 | 7/1917 | United Kingdom . |
| 116948 | 2/1918 | United Kingdom . |
| 437831 | 6/1934 | United Kingdom . |

*Primary Examiner*—Richard M. Camby
*Attorney, Agent, or Firm*—Oldham & Oldham Co., LPA

[57] ABSTRACT

A quick-to-the-ground integrated vehicle leveling and stabilizing apparatus which may be easily and accurately connected to the underside of a vehicle and which may be extended to an operative position and retracted to a storage position with a minimum of operator time and effort. The components of the present invention are self-aligning so that upon being extended to the operative position, the components are automatically properly positioned for the subsequent leveling and stabilizing operations. The apparatus has integral components that need not be separated from the leveling and stabilizing apparatus itself when the apparatus is retracted to a storage position. Furthermore, the apparatus has increased strength and durability relative to known devices.

2 Claims, 9 Drawing Sheets

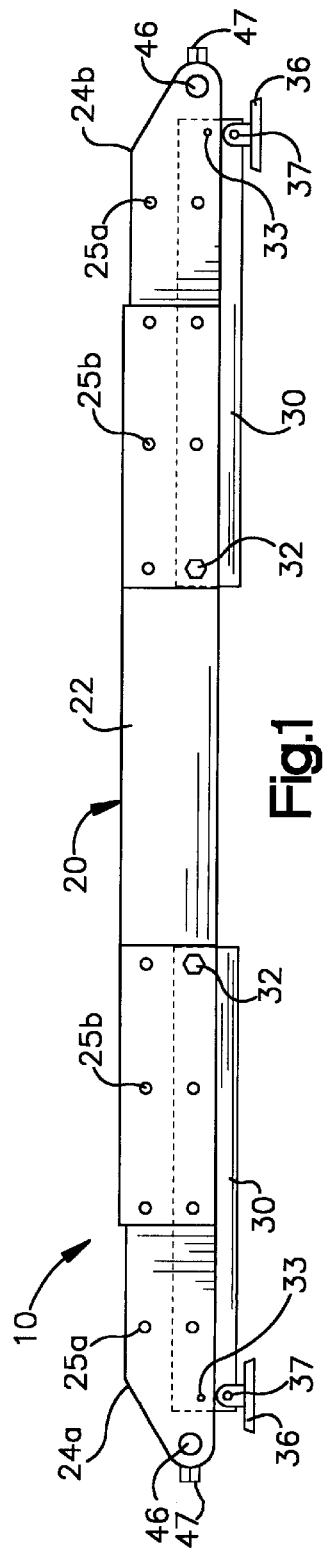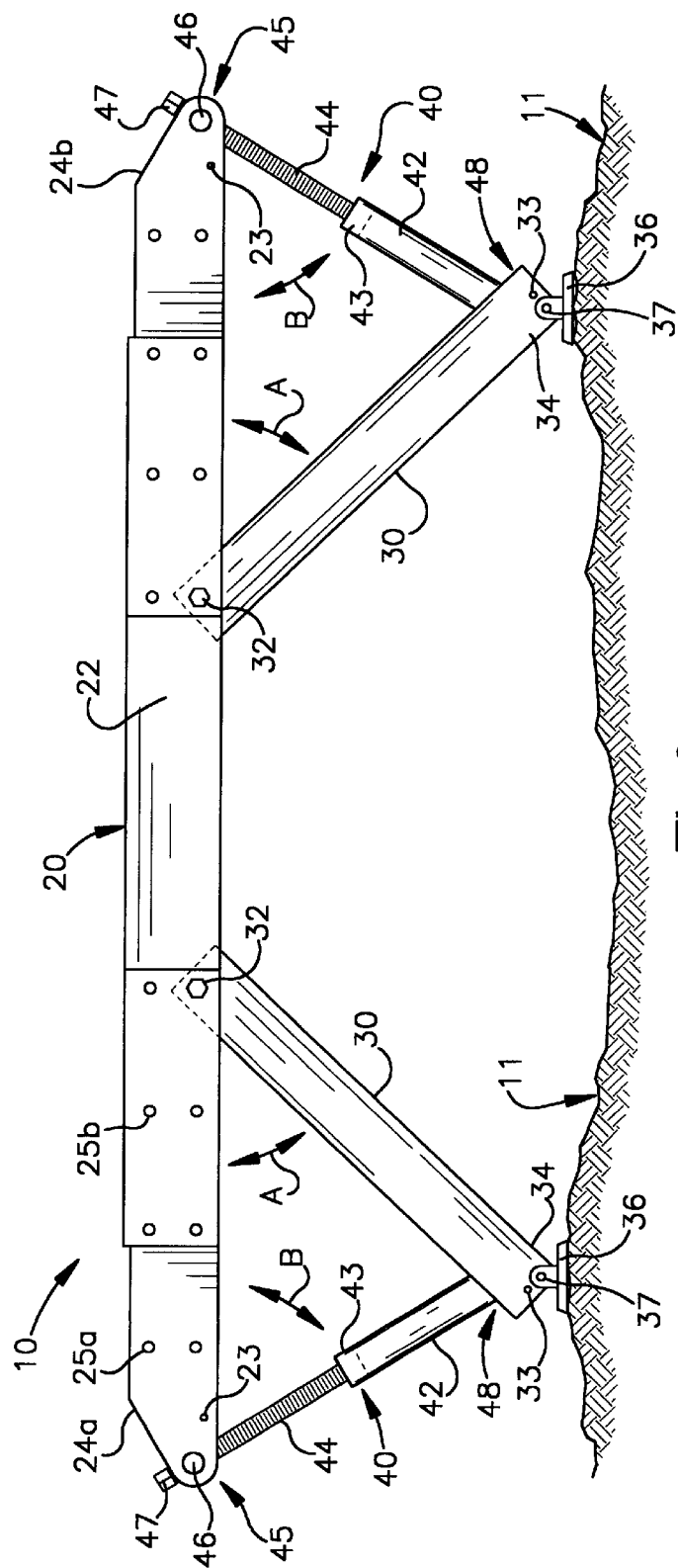

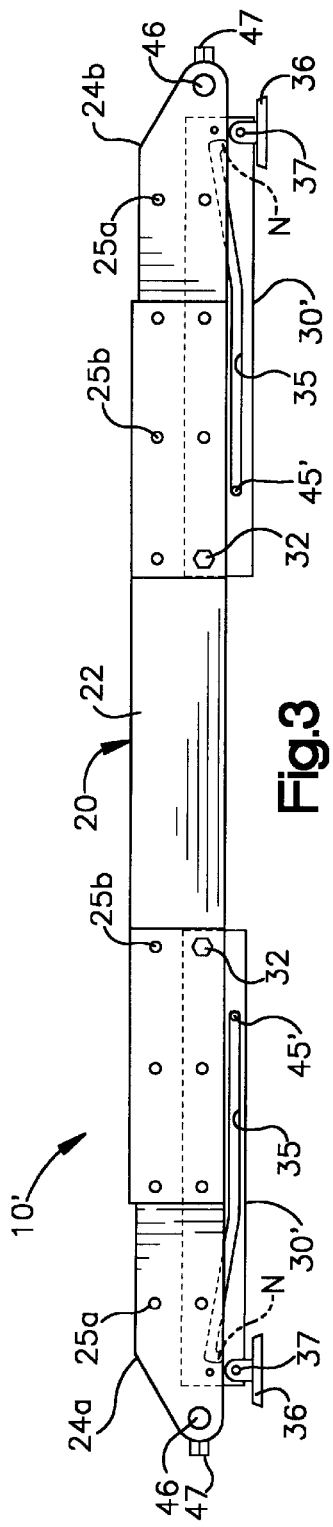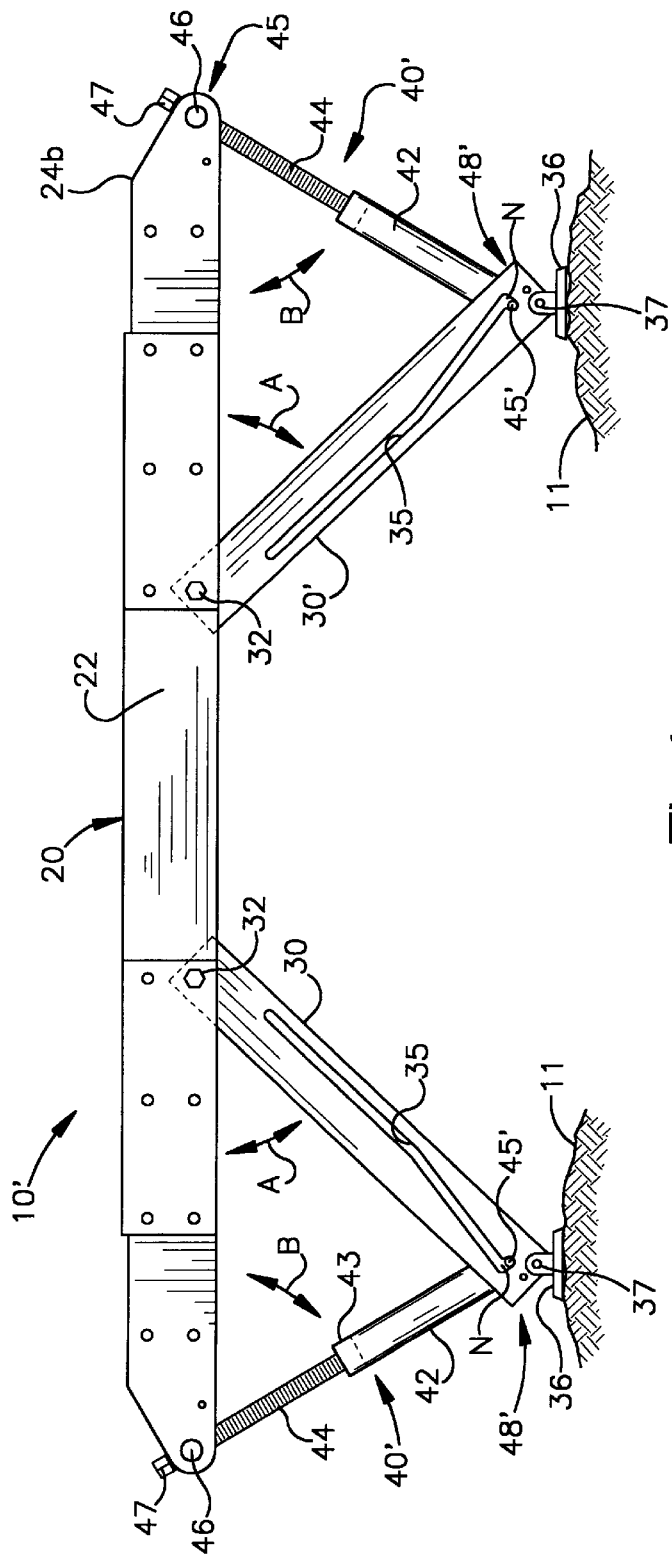

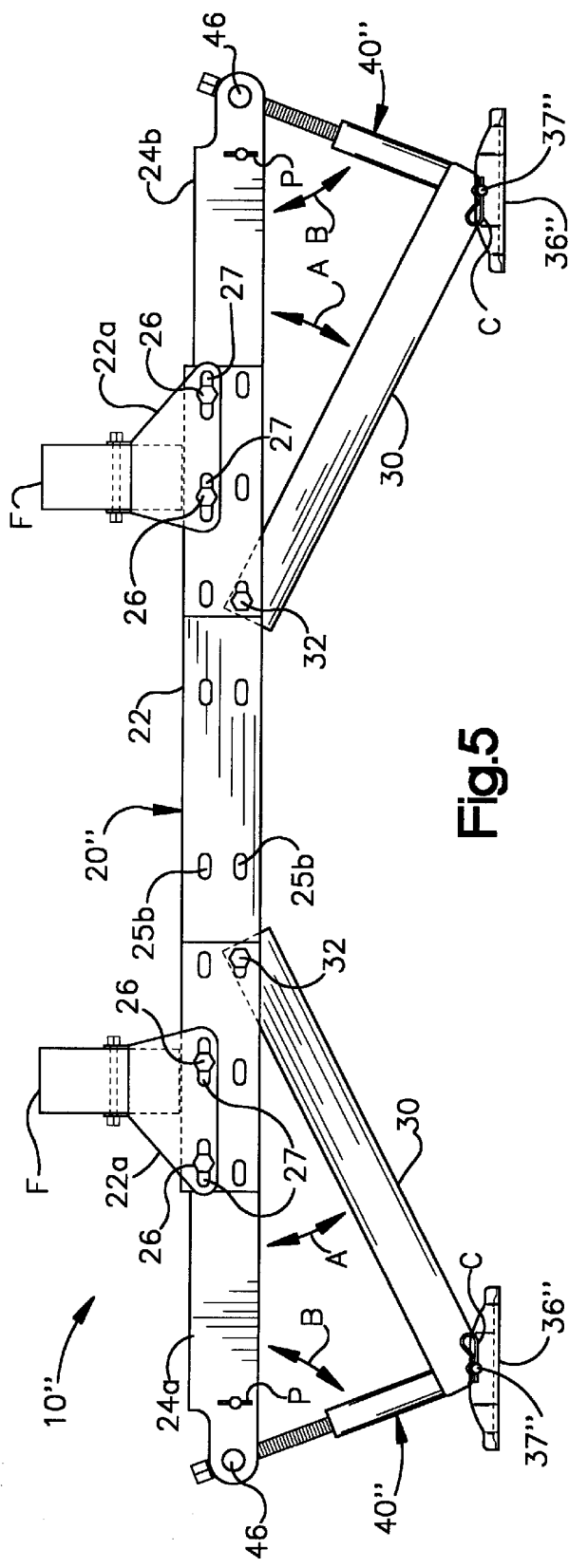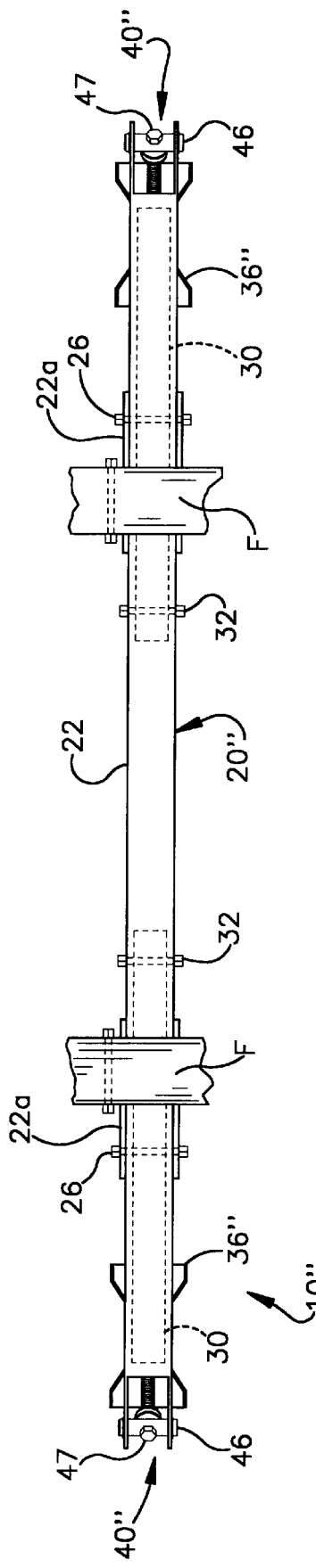

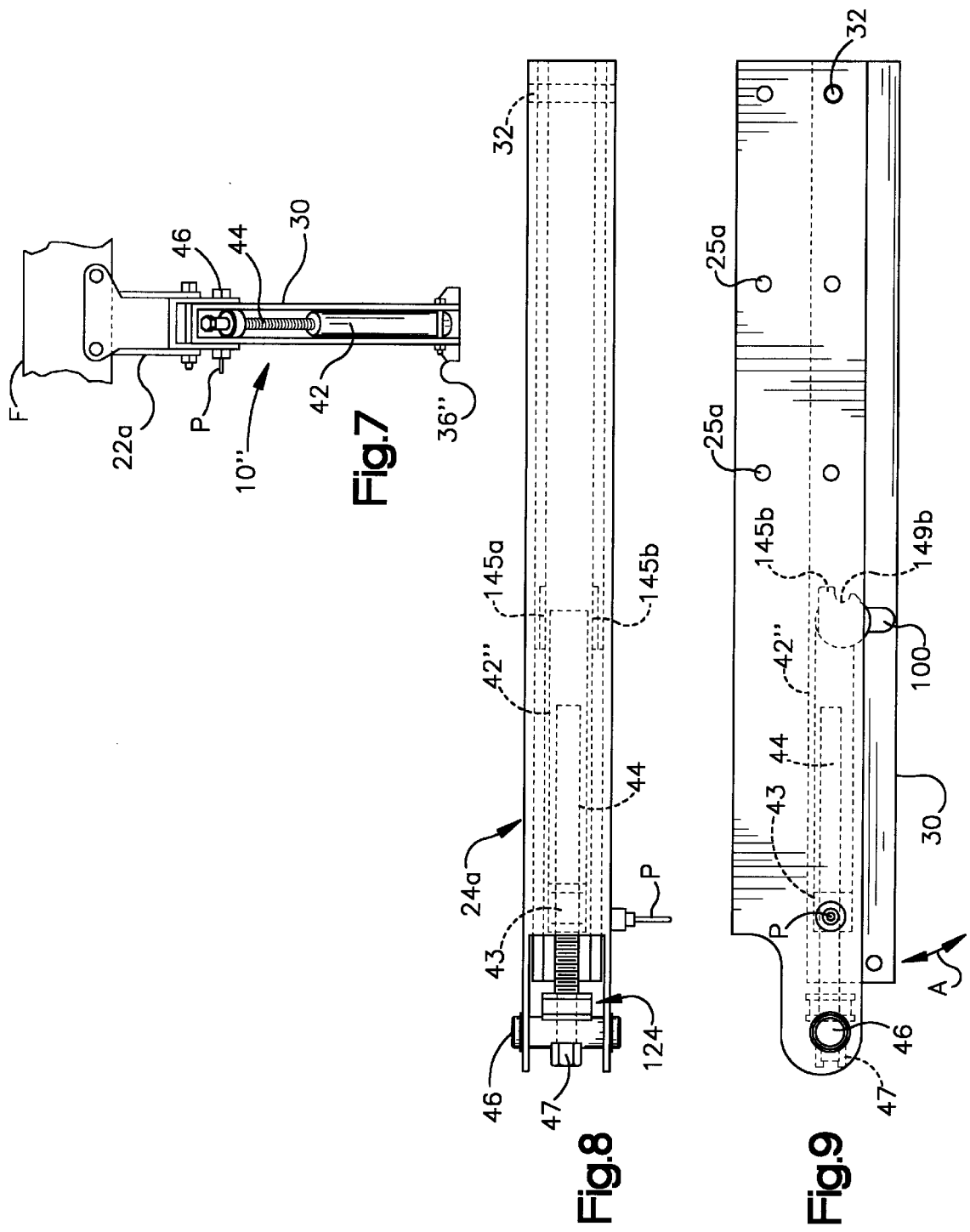

VEHICLE LEVELING AND STABILIZING APPARATUS

This is a continuation-in-part of Application No. 08/752,264 filed Nov. 19, 1996, now U.S. Pat. No. 5,901,980.

FIELD OF INVENTION

This invention relates generally to a vehicle leveling and stabilizing apparatus, and more particularly to a leveling and stabilizing apparatus which may be attached to the underside of a vehicle and thereafter quickly and safely deployed with a minimum of operator time and effort. In a similar manner, the apparatus may be easily retracted to a storage position for times when the vehicle is in motion or when the apparatus is otherwise not needed.

BACKGROUND OF THE INVENTION

Vehicle leveling and stabilizing devices of the type that are attached to the underside of a vehicle for use when the vehicle is at rest are generally well known. These devices include a horizontal cross member for attachment to the underside of a vehicle with a support leg pivotally connected to the cross member. When deployed to support or partially support the weight of a vehicle, a screw jack assembly including a support strut and screw member extends between the support leg and the cross member to brace the support leg away from the cross member to support the vehicle weight. The screw jack assembly is operated to extend/retract the support leg and associated strut relative to the undercarriage of the vehicle to which the apparatus is connected. Recreational vehicles such as trailers and motor homes commonly include one or more of these devices for stabilizing the vehicle when it is at rest. The leveling and stabilizing apparatus is deployed to support or partially support the vehicle weight such that the movement of the vehicle over its resilient suspension in response to the movement of the occupants within the vehicle, for example, is minimized when the vehicle is at rest. Furthermore these devices are utilized to level the vehicle relative to the surface of a parking lot or camp site to improve the comfort of the occupants.

While known leveling and stabilizing devices are generally effective, there has been found a need to provide an integrated vehicle leveling and stabilizing apparatus that may be extended to an operative position and retracted to a storage position with a minimum of operator time and effort without sacrificing strength and durability. Known devices require the operator thereof to slowly extend and retract the support legs of the stabilizing devices with time consuming operation of the screw jack assembly. Another known device includes a support strut and screw jack assembly that must be separated from the stabilizing device when the device is not in use resulting in inconvenience and the potential for misplaced screw jack components. There has also been found a need to provide a leveling and stabilizing apparatus which has superior strength and durability over known devices.

Known leveling and stabilizing devices as described above also lack an effective mechanism for easily and accurately mounting the devices to the underside of a vehicle. Thus, there has also been found a need to provide a vehicle leveling and stabilizing apparatus that is adjustable to fit on vehicles having different widths. Likewise, there has also been found a need to provide a vehicle leveling and stabilizing apparatus, the lateral position of which relative to the underside of the vehicle may be adjusted to compensate for vehicle manufacturing intolerances.

SUMMARY OF THE INVENTION

The present invention is therefore directed to an integrated vehicle leveling and stabilizing apparatus which may be easily and accurately connected to the underside of a vehicle and which may be extended to an operative position and retracted to a storage position with a minimum of operator time and effort. The components of the present invention are self-aligning so that upon being extended to the operative position, the components are automatically properly positioned for the subsequent leveling and stabilizing operations. The present invention provides such an apparatus with integral components that need not be separated from the leveling and stabilizing apparatus itself when the apparatus is retracted to a storage position. Furthermore, the present invention provides such a leveling and stabilizing apparatus with increased strength and durability relative to known devices.

The present invention comprises a cross member for attachment to the underside of a vehicle, at least one support leg having an end pivotally connected to the cross member, and a screw jack assembly including a first, upper end pivotally connected to the cross member and including a second, lower end selectively operatively engageable with the at least one support leg such that the screw jack assembly is positioned to extend between the cross member and the at least one support leg. The screw jack assembly comprises a strut member and a screw member threadably engaged with a threaded nut portion of the strut member to allow the screw jack assembly to be extended or retracted in response to the rotation of its screw member. The apparatus of the present invention preferably includes multiple mounting holes or elongated mounting slots formed through the cross-member thereof such that the lateral position of the apparatus relative to the underside of the vehicle may be easily adjusted. The cross-member is also preferably lengthwise adjustable such that the apparatus may be utilized in conjunction with vehicles of different widths and such that the accessability of the screw jack assembly by an operator is improved. While the apparatus preferably includes an elongated cross-member designed to extend outward from the vehicle centerline in both directions such that a support leg may extend from each end thereof to support opposite sides of the vehicle, the apparatus may be provided with a shorter cross-member including only a single support leg for supporting/leveling a single side and/or corner of a vehicle.

BRIEF DESCRIPTION OF THE DRAWING

FIG. 1 is a front elevational view of a vehicle leveling and stabilizing apparatus in accordance with the present invention wherein the apparatus is shown in its retracted, storage position;

FIG. 2 shows the apparatus of FIG. 1 in its extended, operative position for leveling and/or stabilizing a vehicle;

FIG. 3 is a front elevational view of an apparatus in accordance with the present invention wherein the apparatus is shown in its retracted, storage position;

FIG. 4 shows the apparatus of FIG. 3 in its extended, operative position;

FIG. 5 shows a front elevational view of a third preferred embodiment of a leveling and stabilizing apparatus in accordance with the present invention;

FIG. 6 is a top view of the apparatus shown in FIG. 5;

FIG. 7 is a end elevational view of the apparatus shown in FIG. 5;

FIGS. 8 and 9 respectively show enlarged partial top and front views of the apparatus shown in FIG. 5;

DETAILED DESCRIPTION OF THE INVENTION

Figure 2A:
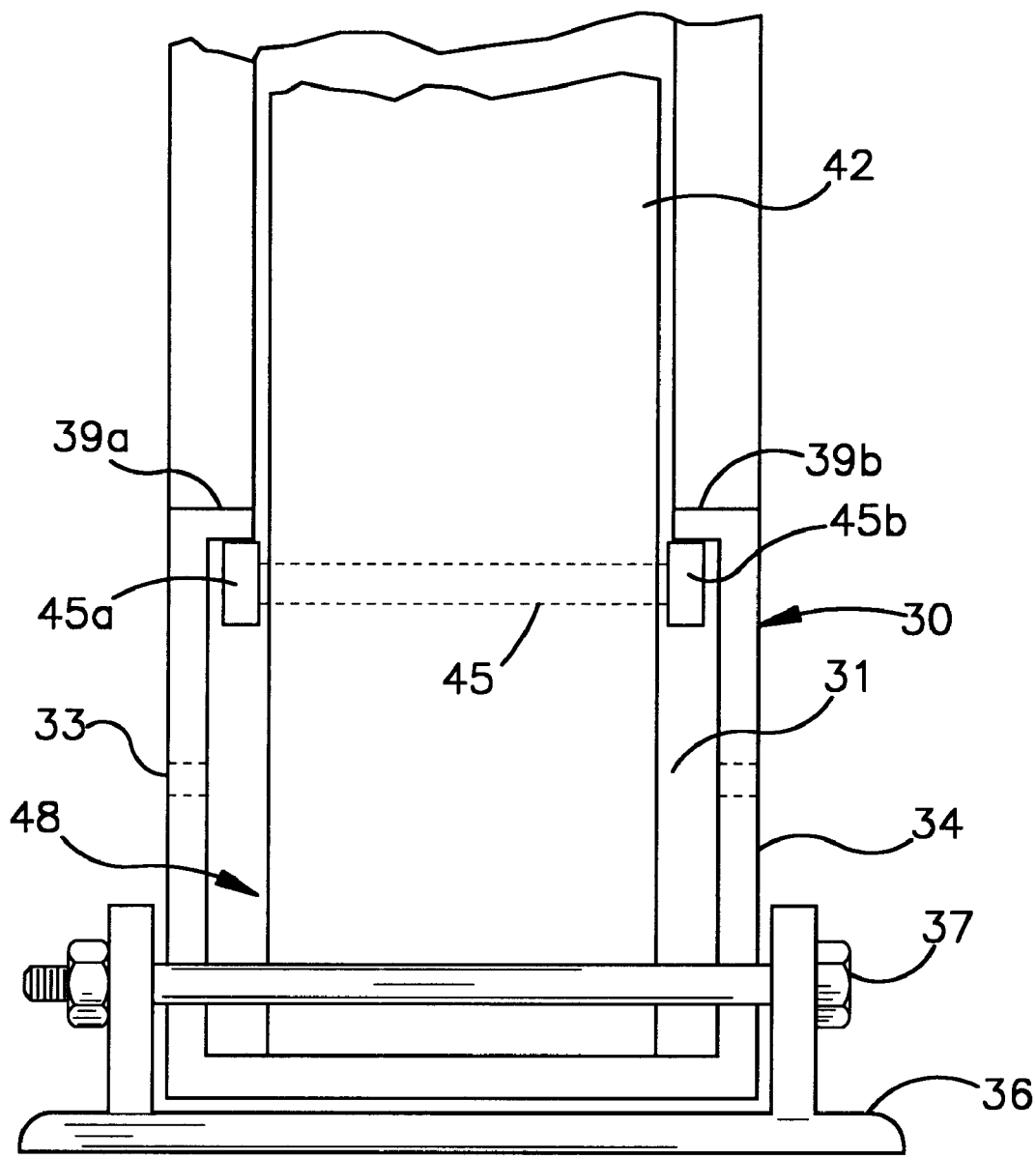
FIG. 2A is an enlarged partial end elevational view showing the lower or distal end of the support leg and the lower or distal end of the strut member of the apparatus shown in FIG. 2.

Referring now to the figures as briefly described above wherein like components of alternative embodiments of the present invention are shown with like reference numerals, FIGS. 1–2A show a first embodiment of a vehicle leveling and stabilizing apparatus 10 in accordance with the present invention. The apparatus 10 comprises a cross-member 20 for connection to the undercarriage or frame of a vehicle (not shown) such as a recreational vehicle, travel trailer, motor home, work vehicle, van, or any such vehicle. Cross-member 20 and other components mentioned hereinafter are preferably metallic and most preferably high grade steel to provide the apparatus 10 with sufficient strength and durability as is required to support significant vehicle loads. Cross-member 20 is preferably lengthwise adjustable such that the apparatus may be easily utilized on vehicles having different widths. As shown herein, the lengthwise adjustability of cross-member 20 is provided by a central section or member 22 having an inverted U-shaped cross-section which slidably receives end sections or members 24a, 24b. Each member 24a, 24b includes a plurality of holes formed therethrough which may be selectively aligned with holes 25b formed through top or sides of central section 22. The relative position of members 22, 24a, 24b (and thus the overall length of cross-member 20) is fixed upon the insertion of one or more bolts or other fasteners through holes 25a formed in members 24a, 24b and holes 25b formed through central section 22. Holes 25a, 25b preferably also act as mounting holes that receive bolts or other suitable fasteners to attach cross-member 20, and thus the apparatus 10, to the frame or other portions of the underside of a vehicle. Cross-member 20 includes multiple laterally spaced holes 25a, 25b so that cross-member 20 may be connected to a wide variety of vehicles without modification thereto. FIG. 5 (described in full detail below) shows an alternative embodiment of cross-member 20 at 20" which comprises elongated holes 25b to facilitate the lengthwise adjustability of members 24a", 24b", and to facilitate the adjustment of the lateral position of cross-member 20" relative to the frame F of the vehicle to which the apparatus 10" is mounted. Specifically, it can be seen the first and second brackets 22a are provided for connecting cross-member 20" to frame members F of the vehicle. Brackets 22a preferably also include elongated mounting holes 27 such that the relative lateral position of cross-member 20" in brackets 22a may be adjustably fixed in position upon the insertion of fasteners such as bolts 26 through one or more aligned holes 25a, 25b, 27.

The main channel/channel extension hole pattern allows for flexibility required to mount assembly on vehicles of various widths and structural frame works.

presently a minimum extension of 73 inches accommodates Class C motor home front sections built on both Ford and GM chop frames. Maximum extension of 99 inches accommodates the rear sections and all Class C motor homes as well as front and rear sections of Class A motor homes and 5th wheel and conventional travel trailers.

The universal mounting brackets align with the channel and extension hole pattern to accommodate the frame dimensions set out in Table A, below.

|  | Front | | Rear | |
| --- | --- | --- | --- | --- |
|  | ID | OD | ID | OD |
| Ford Class C | 33.0 | 41.0 | 37.5 | 42.75 |
| Ford Class A | 28.0 | 34.0 | 28.0 | 34.0 |
| GM Class C | 29.5 | 36.5 | 35.75 | 42.25 |
| GM Class A | 29.0 | 34.0 | 29.0 | 34.0 |
| Travel Trailer | 66.5 | 70.5 | 66.5 | 70.5 |

As mentioned above, in most applications, cross-member 20 will be mounted substantially symmetrically and orthogenally with respect to the front-to-rear longitudinal centerline of a vehicle. As is shown in FIGS. 1–2A, cross-member 20 includes at least one support leg 30 pivotally connected to an inner portion thereof (relative to the vehicle centerline). Each support leg 30 may be connected to cross-member 20 utilizing a bolt 32, a pin, or a similar fastener that extends through support leg 30 and cross-member 20. Each support leg 30 comprises an open U-shaped channel (FIG. 2A) and includes a distal or lower end 34, relative to cross-member 20, to which a support foot 36 is pivotally connected with pin or threaded bolt 37 for dispersing the vehicle load over a larger area of support surface 11 which is typically the ground at a work site, a camp site, or a paved surface. The support feet 36 help to prevent the support legs 30 from sinking into the surface 11. It can be seen with reference to arrow or arc A in FIG. 2 that each support leg 30 is freely pivotable about bolt 32 between a retracted, storage position (FIG. 1) and an extended, operative position (FIG. 2).

Figure 10:
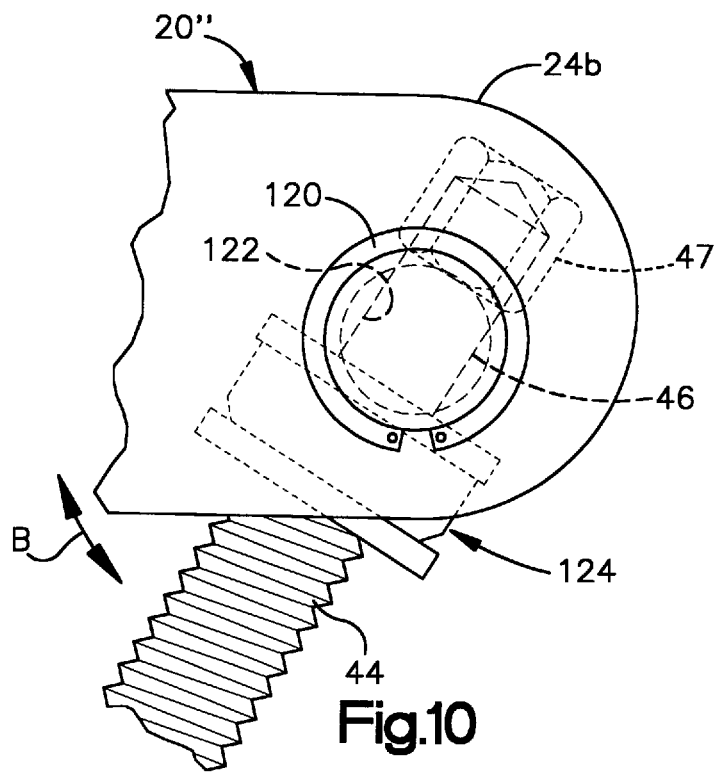
FIG. 10 is an enlarged view of the top right end.
Figure 13:
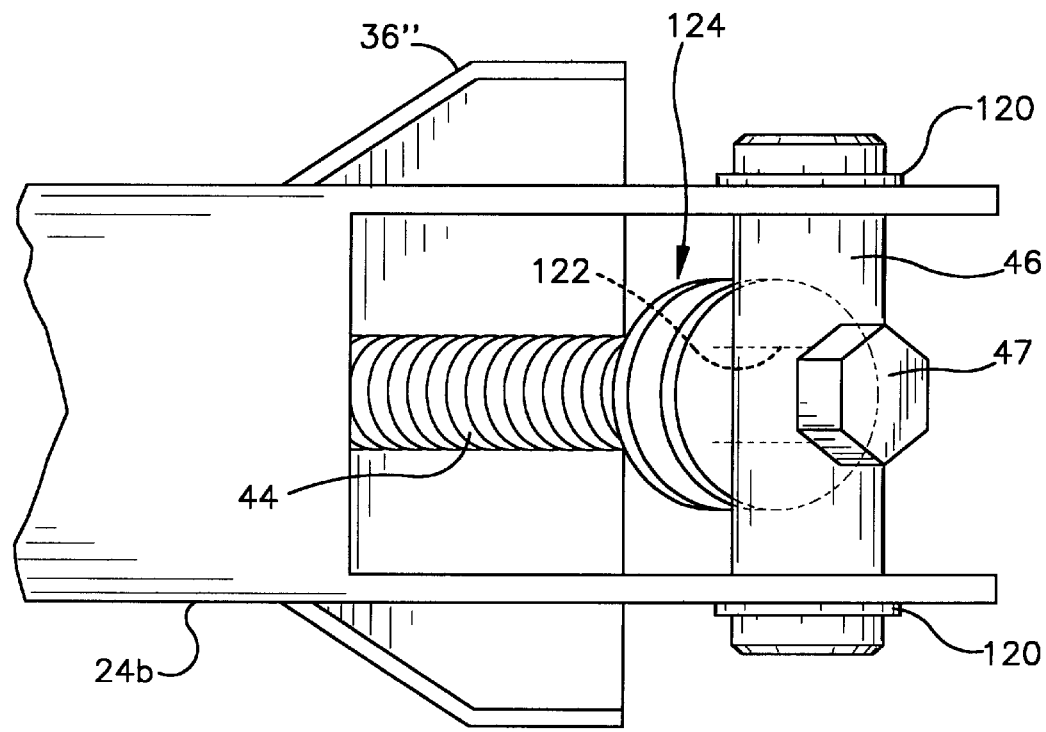
FIG. 13 is an enlarged top view of the right end of FIG. 5.

With continuing reference to FIG. 2, it can be seen that the leveling and stabilizing apparatus 10 of the present invention further comprises a screw jack assembly 40 that is provided in conjunction with each support leg 30 to selectively and adjustably brace each leg 30 away from cross-member 20 as is required to level and/or stabilize a vehicle to which the apparatus 10 is connected. Each screw jack assembly 40 comprises a strut member 42 including a threaded nut portion 43 and a screw member 44 that is threadably engaged with nut portion 43 of strut member 42 and selectively extensible from strut member 42 in response to the rotation of the screw member 44. Nut portion 43 of strut member 42 is designed to prevent accidental rotation ("backing-up") of the screw member 44 under the load of a vehicle. This can be accomplished, for example, using "Acme" threads which are known in the art of threads and which "lock" upon the application of axial force thereto. Screw jack assembly 40, and in particular screw member 44, includes an upper end 45 that is pivotally connected to an outer portion of cross-member 20 (relative to the more inward point of connection of support leg 30) using a cross pin or trunnion member 46, or any other suitable fastener. As is described in detail below with reference to FIGS. 10 and 13, screw member 44 is rotatably connected to pin 46 so that screw member 44 may be rotated without causing rotation of pin 46. Head 47 of screw member 44 is hexagonally shaped or otherwise includes flats or is configured to be engaged by a driving tool such as a wrench or ratchet-type wrench such that an operator of the leveling and stabilizing apparatus 10 may easily rotate screw member 44 and thus lengthen or shorten screw jack assembly 40 to respectively extend or retract support leg 30 relative to cross-member 20. This arrangement of screw member 44 and strut member 42 also provides a screw jack assembly 40 with an improved range of motion without causing axial movement of the head 47 of the screw member 44. The second or lower end 48 of screw jack assembly 40, and more particularly of strut member 42, is selectively engageable with the lower end 34 of support leg 30 for operation of leveling and stabilizing apparatus 10. As shown in FIGS. 1–2A, support leg 30 is manufactured to have a "U" shaped cross-section that acts as a channel 31 (FIG. 2A) that receives lower end 48 of strut member 42 therein. A notch, stop-pin, or the like such as support foot retention pin 37 may be provided within the-U-shaped channel 31 of support leg 30 to engage and restrain lower end 48 of support strut 42 when the screw jack assembly 40 and its associated support leg 30 are operatively positioned as shown in FIGS. 2 and 2A. Once the screw jack assembly 40 and its associated support leg 30 are operatively positioned as shown in FIGS. 2 and 2A, screw member 44 may be rotated in first and second directions to respectively extend and retract screw member 44 from strut member 42. Those skilled in the art will recognize that the extension of screw member 44 from strut 42 will extend leg 30 away from cross-member 20 while the retraction of screw member 44 into strut member 42 will cause the support leg 30 to retract toward cross-member 20. The combination of strut member 42 and screw member 44 as shown herein, rather than simply providing a screw member that extends the entire distance between cross-member 20 and support leg 30 is though to provide an apparatus of superior strength and durability.

As is seen most clearly in FIG. 2A, lower end 48 of strut member 42 includes a cross-pin 45 with ends 45a and 45b that slidably or otherwise movably restrain lower end 48 of strut member 42 in U-shaped channel 31 of support leg 30. It can be seen that U-shaped channel 31 includes first and second flanges 39a, 39b that respectively engage ends 45a, 45b of cross-pin 45 to thus retain end 48 of strut member 42 within channel 31 while allowing end 48 of strut member 42 to slide within channel 31. Those skilled in the art will recognize that cross-pin 45 may be replaced with a wide variety of equivalent structures such that strut member 42 is engaged by flanges 39a, 39b of support leg 30. For example, studs, rollers, or the like may simply be welded or otherwise attached to strut member 42 in the location of heads 45a, 45b of cross-pin 45. Furthermore, as is shown in FIG. 2A, end 48 of strut member 42 rests against support foot retention pin 37 when the apparatus 10 is extended to its operative position. Support foot retention pin 37 prevents further pivoting of screw jack assembly along arc B, and thus acts in conjunction with cross-pin 45 to prevent end 48 of strut member 42 from disengaging from U-shaped channel 31. Also, the contact between end 48 of strut member 42 and pin 37 acts to self-align the support leg 30 and screw jack assembly 40 in the proper operative position of the apparatus 10. A main advantage of the present invention 10 is its ability to be extended to its operative position and retracted to its storage position very quickly, with a minimum of operator timeand effort, and without significant operation of the screw jack assembly 40 being required. Furthermore, as discussed above, the apparatus 10 of the present invention is self-aligning, such that upon being extended from the storage position to the operative position, no further alignment of the components by the operator is required before the apparatus 10 may be put into use for leveling and stabilizing the vehicle, and the operator may immediately begin operating the screw jack assembly 40 to level/stabilize the vehicle. As is shown in FIG. 2, the sliding engagement of end 34 of support legand end 48 of screw jack assembly 48 allows leg 30 to be pivoted along an arc as shown by the arrow A about fastener 32 while screw jack assembly 40 may be pivoted along an arc as shown by the arrow B about cross-pin 46. The U-shaped cross-section of support leg 30 allows screw jack assembly 40 to nest in the U-shaped channel 31 of leg 30 when leg 30 and screw jack assembly 40 are retracted to lie adjacent to cross-member 20 as is shown in FIG. 1. It can also be seen in FIG. 1 that the inverted U-shaped cross-section of cross-member 20 and U-shaped cross-section of each support leg 30 allows the cross-member 20 to at least partially nest within channel 31 thereof This nesting of the components maximizes the clearance between the apparatus 10 and the ground 11. A pin P (shown only in FIGS. 5-9 in connection with apparatus 10") or another suitable latch mechanism is provided to retain leg 30, and thus screw jack assembly 40,in this retracted, storage position. Specifically, pin P, which may be attached to the cross member 20, is inserted through a hole 33 in support leg 30 and an aligned hole 23 in cross-member 20 such that leg 30 is restrained from pivoting about bolt 32 along arc A When an operator desires to deploy the leveling and stabilizing apparatus 10, the pin P is removed from holes 23,33 such that the support leg 30 pivots about bolt 32 under the force of gravity along arc A until lower end 48 of strut member 42 engages support foot retention pin 37 as described above and as is shown in FIGS. 2 and 2A. Simultaneously, the pivoting of support leg 30 away from cross-member 20 along arc A allows screw jack assembly 40 to pivot downward about cross-pin 46 along arc B with lower end 48 sliding within channel 31 as described until lower end 48 of strut member 42 and distal end 34 of support leg 30 become operatively engaged. In most situations, the apparatus is self-aligning in that upon contact between the lower end 48 of strut member 42 and bolt or pin 37 which acts as a stop means, the support leg 30 and the screw jack assembly 40 are in alignment as required to begin leveling and stabilizing operations. Ordinarily, the operator of the apparatus need not adjust the relative position of the components prior to beginning the leveling and stabilizing operations. In certain unusual situations, limited clearance between the apparatus 10 and the ground 11 may require that the screw jack assembly 40 be shortened to effect the complete operative engagement of end 48 of strut member 42 with end 34 of support leg 30 as described. Once these ends 48 and 34 of the strut member 42 and support leg 30, respectively, are operatively engaged, the screw member 44 may be rotated to lengthen screw jack assembly 40 such that the support leg 30 is forcibly extended away from the cross-member 20 to thus bear a portion of the vehicle weight for leveling and stabilizing purposes.

FIGS. 3–4 show an alternative embodiment of the present invention 10' which is similar in all respects to leveling and stabilizing apparatus 10 except for the configuration of each support leg 30' and its associated screw jack assembly 30'. Specifically, the apparatus 10' utilizes an alternative arrangement to provide the sliding engagement between each support leg 30' and the lower end 48' of its respective screw jack assembly 40' wherein support leg 30' includes a slot 35 formed in at least one and preferably both sidewalls thereof and wherein lower end 48 of strut member 42 includes a cross-pin 45' that is slidably engaged with the at least one slot 35 as shown. The operation of pin 45' in slot 35, and specifically the engagement of pin 45' with the notch N, which acts as a stop means as is seen most clearly in FIG. 3, when the support leg 30' and screw jack assembly 40' are fully extended to their operative positions as shown in FIG. 4, acts to ensure that the support leg 30' and screw jack 40' are properly and completely extended and aligned prior to the operation of screw jack assembly 40' to level and/or stabilize the vehicle. Thus, the apparatus 10' is also self-aligning as discussed above in relation to the apparatus 10.

Referring now also to FIGS. 5–13, an alternative preferred embodiment of the present invention is shown at 10" and, except as noted below, the apparatus 10" is similar in all respects to the apparatus 10 discussed above. Cross member 20" is provided by a central section 22 which adjustably receives end sections 24a, 24b. Uni-brackets or mounting brackets B are provided to interconnect frame F of a vehicle and cross member 20" and elongated mounting slots or holes 25b, 27 are provided through central section and/or brackets B such that the lateral position of the cross-member 20" relative to the frame F may be adjusted within the limits imposed by the size of slots or holes 25b, 27.

FIGS. 5, 6, 10, and 13 show a suitable structure for attaching upper end 45 of screw jack assembly 40,40',40" to the cross-member 20,20". Specifically, as is described above in relation to FIGS. 1–2A, a cross-pin 46 is provided and pivotably connected to cross member 20" such that pin 46 provides a pivot point for screw jack assembly 40,40',40" to pivot along arc B. P in 46 may be held in position as described using suitable "C" clips 120 or the like. Pin 46 includes a transverse bore 122 which rotatably receives screw member 44 such that screw member 44 may be rotated without causing twisting or other movement of pin 46. A thrust bearing assembly 124 is provided such that screw member 44 may be rotated without undue effort and without causing wear of the screw member 44 and/or pin 46.

FIG. 6 also shows an alternative design for support feet 36" wherein each foot has the shape of a "bow tie" or "dog bone" wherein the central portion of each support foot 36" has a smaller width relative to the ends thereof. This design for feet 36" provides the required stability, but also reduces or eliminates the potential for the steering road wheels of the vehicle to contact-the feet 36" during lock-to-lock steering operations as is often required during parking and the like. Furthermore, it can be seen in FIGS. 5 and 12A that each support foot 36" is connected to the apparatus 10" with a straight pin 37" which is held in position by a clip pin C, which allows for the easy replacement of the feet 36" without the aid of tools. As is described below, pin 37" is engaged by the lower end 48" of strut member 42" and a straight pin 37" is thought to be preferable over a threaded bolt 37 as is shown in FIGS. 1–4.

Figure 11:
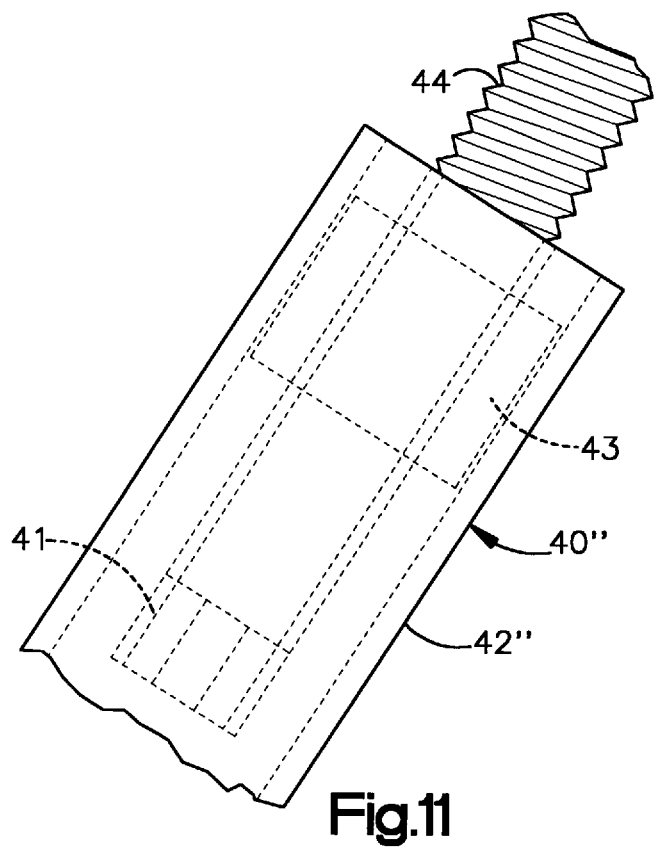
FIG. 11 is an enlarged view of the middle portion of the right end of FIG. 5.

With reference to FIG. 11, the threaded connection between screw member 44 and strut member 42" of the screw jack assembly 40" is shown in detail, wherein it can be seen that the threaded nut portion 43 of the strut member 42" is preferably provided at the upper portion of the strut member 42". Threaded nut portion 43 may be made of a wide variety of suitable materials that allow for ease of operation and durability. It has been found suitable, for example, to manufacture threaded nut portion 43 from sintered metals. Furthermore, threaded nut portion 43 and screw member 44 are preferably provided with coacting Acme threads such that unwanted accidental rotation of the screw member 44 relative to the threaded nut portion 43 is prevented under the load of the vehicle. Finally, it can be seen that end 41 of screw member 44 is crimped or is otherwise shaped or includes means to prevent screw member 44 from being completely "unscrewed" from its threaded connection with strut member 42".

Figure 12A:
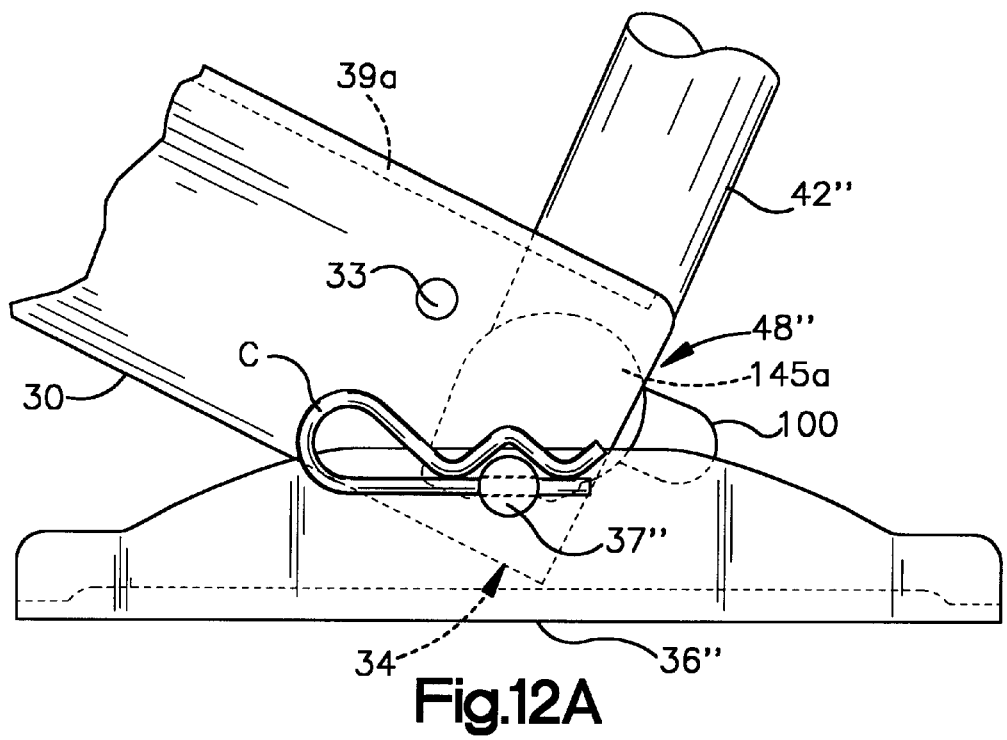
FIG. 12A is an enlarged view of the lower foot portion of FIG. 5.
Figure 12B:
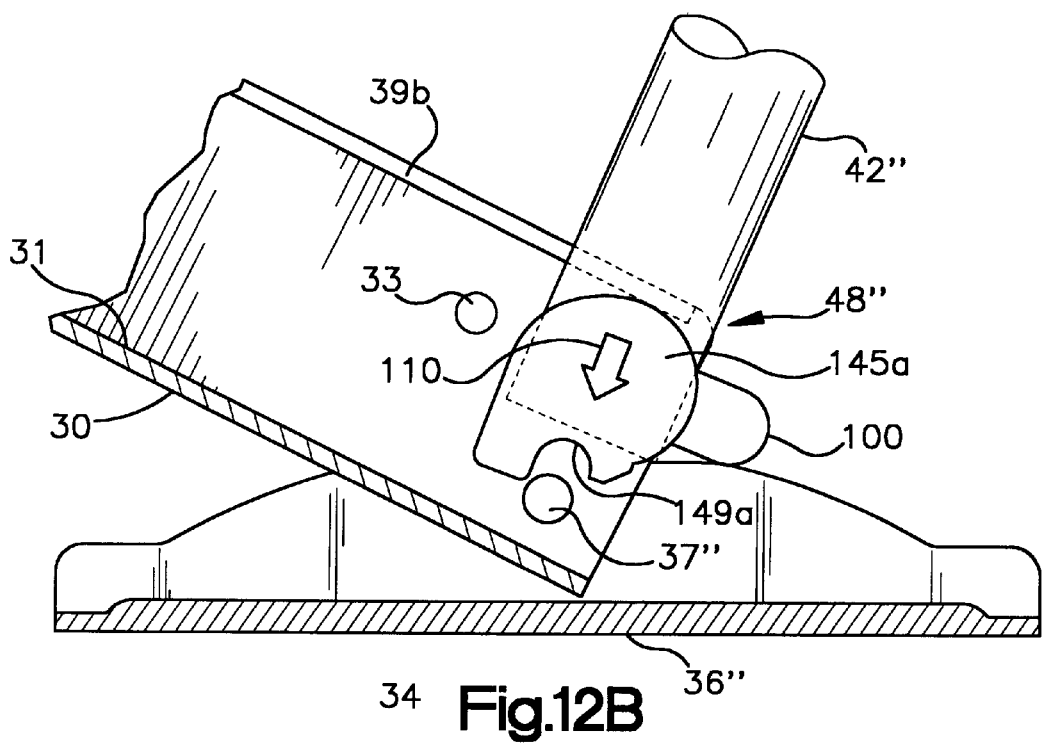
FIG. 12B is an enlarged view of the lower foot portion of FIG. 5, in partial cross section and illustrating the engagement of the lower ends of the strut member and the support leg.
Figure 12C:
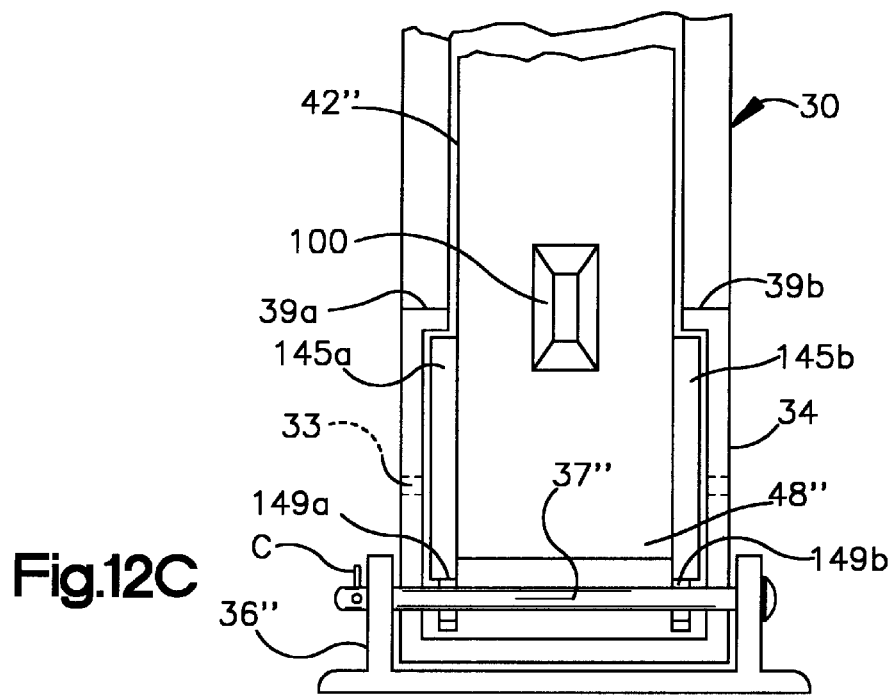
FIG. 12C is an enlarged partial end elevational view showing the distal or lower end of the support leg and the distal or lower end of the strut member of the apparatus shown in FIG. 5.

The apparatus 10" includes a rubber bumper 100 positioned at the lower end 48" of strut member 42" such that when the apparatus 10" is in its retracted, storage position, vibration of the screw jack assembly 40" within the channel 31 of support leg 30, in response to vehicle motion over a roadway is eliminated. When each support leg 30 is retracted to its storage position adjacent to cross-member 20", for example as is shown in FIG. 9, rubber bumper 100 acts to resiliently bias the screw jack assembly 40" upward against the cross-member 20" which prevents the vibration of the screw jack assembly 40". Rubber bumper 100 also acts to consistently position screw jack assembly 40" in a fully retracted storage position such that pin P is more easily engaged with support leg 30, without adjustment of the components by the operator thereof Referring now particularly to FIGS. 12A–12C, the lower end 48" of strut member 42" and its engagement with lower end 34 of support leg 30 are shown in detail. As is described above in relation to strut member 42, lower portion 48" of strut member 42" is slidably engaged with lower end 34 of support leg 30 such that each member 30,42" can pivot along its respective arc A,B between the storage and operative positions as described herein. Strut member 42" is different from strut member 42 described above in that end 48 of strut member 42" includes first and second notches 149a, 149b formed therein to engage support foot retention pin 37". While notches 149a, 149b may be formed directly in member 42", it has been found preferable to provide notches 149a, 149b respectively in first and second latch plates 145a, 145b which are connected to the lowermost portion 48" of strut member 42" on opposite sides thereof As may be seen most clearly in FIG. 12C, latch plates 145a, 145b engage flanges 39a, 39b of support leg 30 and thus slidably retain strut member within channel 31 of leg 30. The first and second latch plates 145a, 145b respectively includes the first and second notches 149a, 149b that engage pin 37". With further reference to FIGS. 12A–12B, it can be seen that when each support leg 30 and its associated screw jack assembly 40" are pivoted into the operative position, the notches 149a, 149b of the strut member 42" are automatically positioned above pin 37", and the operator of the apparatus 10" need only rotate the screw member 44 a small amount to cause the notches 149a, 149b to move downward as is indicated by arrow 110, and engage pin 37". Further operation of screw member 44 will result in the leveling and stabilizing of the vehicle with the weight of the vehicle being support by pin 37". It should be recognized that the pin 37" acts as a stop means and thus, the apparatus 10" is self-aligning in that no adjustment of the components is required once they are fully extended into the operative position. Furthermore, the latch plates 145a, 145b act to prevent the lower end 48" of the strut member 42" from swinging past pin 37" and out of the channel 31 of the support leg 30. As is shown in FIG. 12C, it is thought preferable for the notches 149a, 149b of strut member 42" to engage pin 37" as close to the ends of pin 37" as possible to minimize bending stresses on the pin 37". If desired, latch plates 145a, 145b may be lengthened such that they contact the inner surface of channel 31 when the apparatus is in its operative position. This would reduce the amount of the vehicle weight supported on pin 37" with some of the weight being supported by the inner surface of the channel 31 of leg 30.

Figure 14:
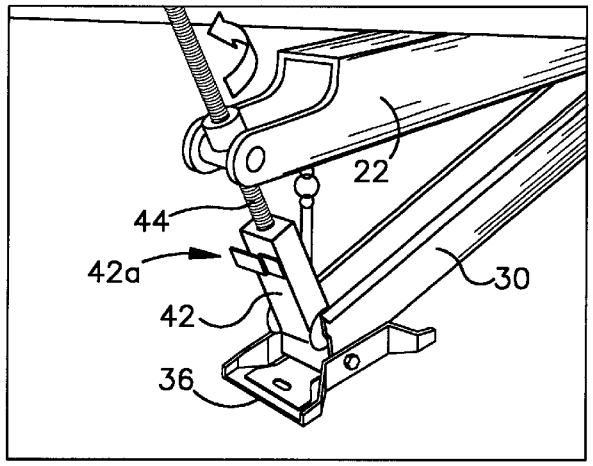
FIG. 14 is a perspective view of one end of an alternative embodiment of a vehicle leveling and stabilizing apparatus made according to the present invention; and, FIG. 15A and 15B are perspective views of the embodiment of a vehicle leveling and stabilizing apparatus shown in FIG. 14, illustrating the apparatus in a retracted, storage position.
Figure 15A:
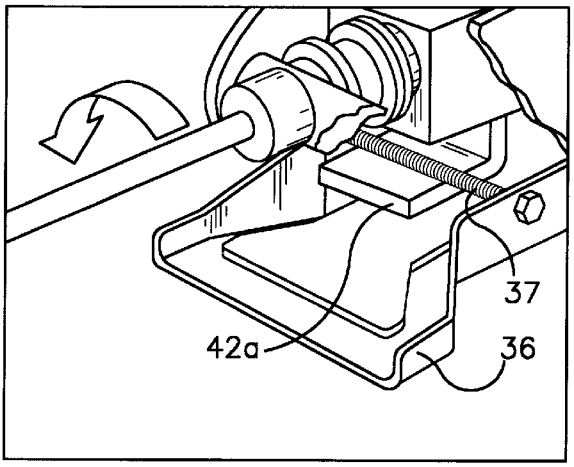
Figure 15B:
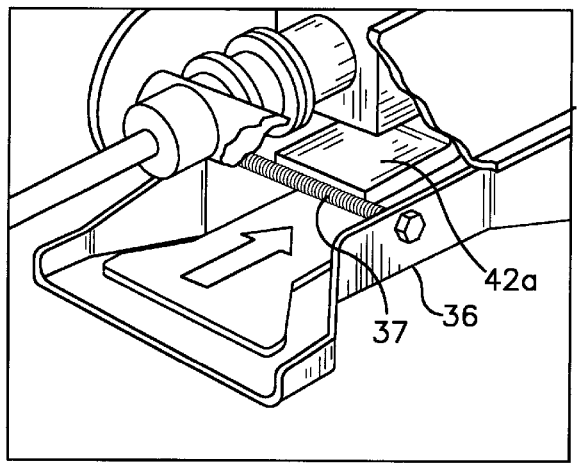

In FIG. 14, a close-up view in perspective of one end of a vehicle stabilizer is shown in its extended or operative position for leveling or stabilizing a vehicle. This embodiment employs an optional travel locking tab 42a, which is welded or otherwise securely attached to strut member 42. Travel locking tab 42a has no assigned function when the stabilizer is in its extended position, however, tab 42a serves as a means to retain the leg assembly in its stored or travel position. Travel locking tab 42a is intended to engage bolt 37 in order to retain the stabilizer in its stored or travel position as shown in FIG. 15A. To lower the jack assembly and release travel lock tab 42a 's engagement of bolt 37, the drive screw member 44 must be rotated to extend strut member 42, thereby disengaging tab 42a from bolt illustrated in FIG. 15B. When the leveling and stabilizing apparatus 10 is converted from the extended, operative position shown in FIG. 14 to its storage or travel position, it is necessary that the screw jack assembly be extended enough to allow clearance of tab 42a past bolt 37. Thereafter, drive screw member 44 is rotated to draw travel lock tab 42a on strut member 42 into locking engagement with bolt 37. Travel lock tab 42a may be used alone or in conjunction with other locking means.

Those skilled in the art will recognize that the foregoing description has set forth the preferred embodiment of the invention in particular detail and it must be understood that numerous modifications, substitutions, and changes may be undertaken without departing from the true spirit and scope of the present invention.

What is claimed is:

1. A vehicle leveling and stabilizing apparatus comprising:

a cross member;

at least one support leg having an upper end and a lower end, said lower end including a support foot attached with a foot support fastener; and a screw jack assembly having at an upper end a screw member and at a lower end a strut member with a travel locking tab attached to said strut member, said screw jack assembly being connected pivotally to said cross member such that said screw jack assembly is freely pivotable between a retracted storage position and an extended operative position, said screw member being threadably engaged with said strut member such that the length of said screw jack assembly is variable in response to rotation of said screw member, said lower end of said screw jack assembly being selectively engaged with said at least one leg when said at least one support leg and said screw jack assembly are extended to their operative positions, and said travel locking tab of said strut member being selectively engaged with said foot support fastener when said at least one support leg and said screw jack assembly are retracted to their storage position.

2. An apparatus as recited in claim 1, wherein said foot support fastener is a bolt and said travel locking tab is L-shaped and is attached to said strut member at an end portion of said strut member that is threadably engaged by said screw member.

* * * * *